US010046629B2

(12) United States Patent
Kim

(10) Patent No.: US 10,046,629 B2
(45) Date of Patent: Aug. 14, 2018

(54) AUTOMATIC COVER APPARATUS FOR CARGO COMPARTMENT OF TRUCK

(71) Applicant: Kyung-Min Kim, Incheon (KR)

(72) Inventor: Kyung-Min Kim, Incheon (KR)

( * ) Notice: Subject to any disclaimer, the term of this patent is extended or adjusted under 35 U.S.C. 154(b) by 0 days.

(21) Appl. No.: 15/515,145

(22) PCT Filed: Oct. 22, 2014

(86) PCT No.: PCT/KR2014/009935
§ 371 (c)(1),
(2) Date: Mar. 28, 2017

(87) PCT Pub. No.: WO2016/060309
PCT Pub. Date: Apr. 21, 2016

(65) Prior Publication Data
US 2017/0217293 A1     Aug. 3, 2017

(30) Foreign Application Priority Data

Oct. 16, 2014 (KR) .......................... 10-2014-0139838

(51) Int. Cl.
*B60J 7/08*     (2006.01)
(52) U.S. Cl.
CPC .................................... *B60J 7/085* (2013.01)
(58) Field of Classification Search
CPC ....................................................... B60J 7/085
USPC .................... 296/98, 100.15, 100.18, 100.16
See application file for complete search history.

(56) References Cited

U.S. PATENT DOCUMENTS

| | | | |
|---|---|---|---|
| 4,030,780 A * | 6/1977 | Petretti | B60J 7/085 160/67 |
| 4,050,734 A | 9/1977 | Richard | |
| 4,484,777 A * | 11/1984 | Michel | B60J 7/085 135/88.09 |
| 4,529,098 A * | 7/1985 | Heider | B60J 7/085 220/211 |
| 6,474,718 B1 | 11/2002 | Henning | |
| 6,857,682 B2 * | 2/2005 | Eggers | B60J 7/085 296/98 |
| 8,215,698 B1 * | 7/2012 | Rogers | B60J 7/085 296/98 |
| 8,226,150 B1 | 7/2012 | Schmeichel et al. | |

(Continued)

FOREIGN PATENT DOCUMENTS

JP          06-344822 A      12/1994
KR   20-1995-0005123 Y1      6/1995
(Continued)

*Primary Examiner* — Jason S Morrow
(74) *Attorney, Agent, or Firm* — Maschoff Brennan

(57) ABSTRACT

The present invention relates to an automatic cover apparatus for a cargo compartment of a truck, the apparatus including a cover for opening and closing the top of the cargo compartment and two supporting rods installed on either side of the cover to transfer the cover (200) from the front to the rear of the cargo compartment. A winding drum is installed between the two supporting rods, for winding and withdrawing the cover, with two winding drum reinforcing portions installed a certain distance apart at the center thereof. A stopper is installed a certain distance apart on both sides at the upper rear of the cargo compartment and has a downward slope of 35° and 80°.

3 Claims, 8 Drawing Sheets

(56) References Cited

U.S. PATENT DOCUMENTS

| | | | | |
|---|---|---|---|---|
| 2005/0062314 A1* | 3/2005 | Searfoss | ............... | B60J 7/085 296/186.1 |
| 2010/0219656 A1 | 9/2010 | Chenowth et al. | | |
| 2010/0253111 A1 | 10/2010 | Reeder et al. | | |
| 2016/0375748 A1* | 12/2016 | Munter | ................ | B60J 7/085 296/98 |
| 2017/0057332 A1* | 3/2017 | Schmeichel | ............ | B60J 7/085 |

FOREIGN PATENT DOCUMENTS

| KR | 200197649 Y1 | 9/2000 |
|---|---|---|
| KR | 1020000053861 A | 9/2000 |
| KR | 100439018 B1 | 6/2004 |
| KR | 10-0849471 B1 | 7/2008 |
| KR | 100849471 B1 | 7/2008 |
| KR | 10-2011-0099565 A | 9/2011 |

\* cited by examiner

【Fig. 1】
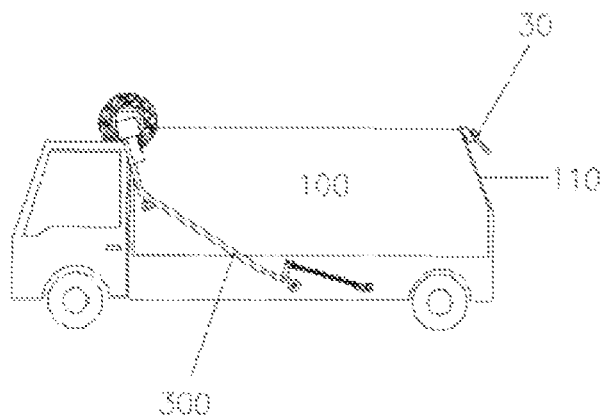

[Fig. 2]
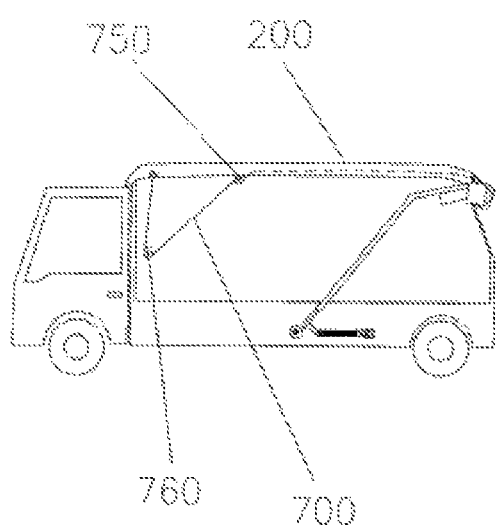

[Fig. 3]
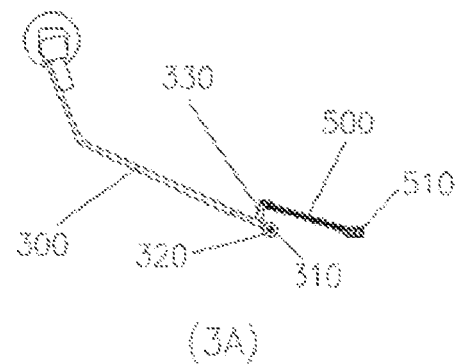
(3A)
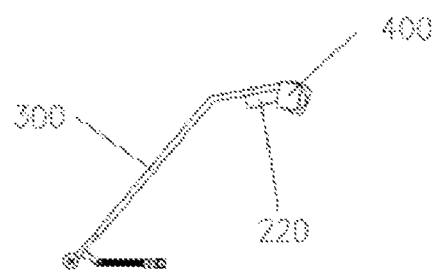
(3B)

【Fig. 4】
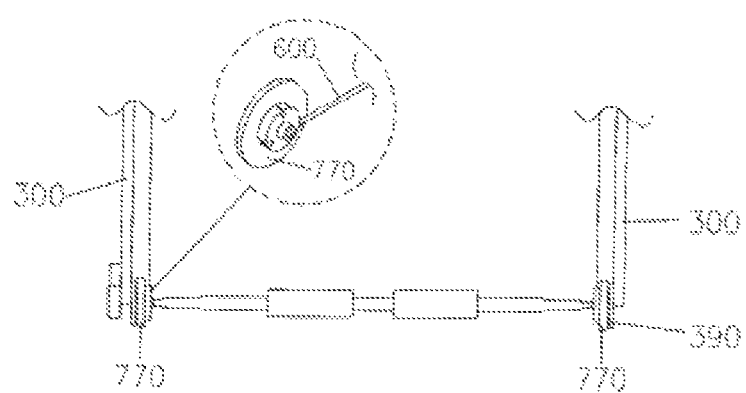
(4A)
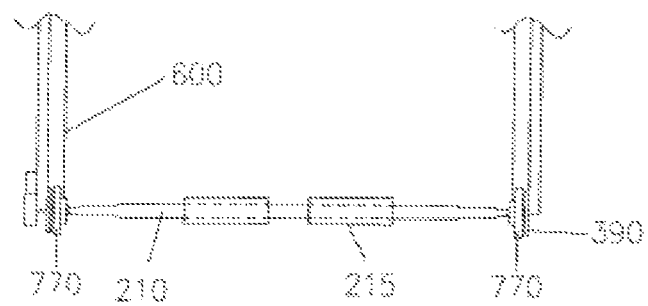
(4B)

[Fig. 5]
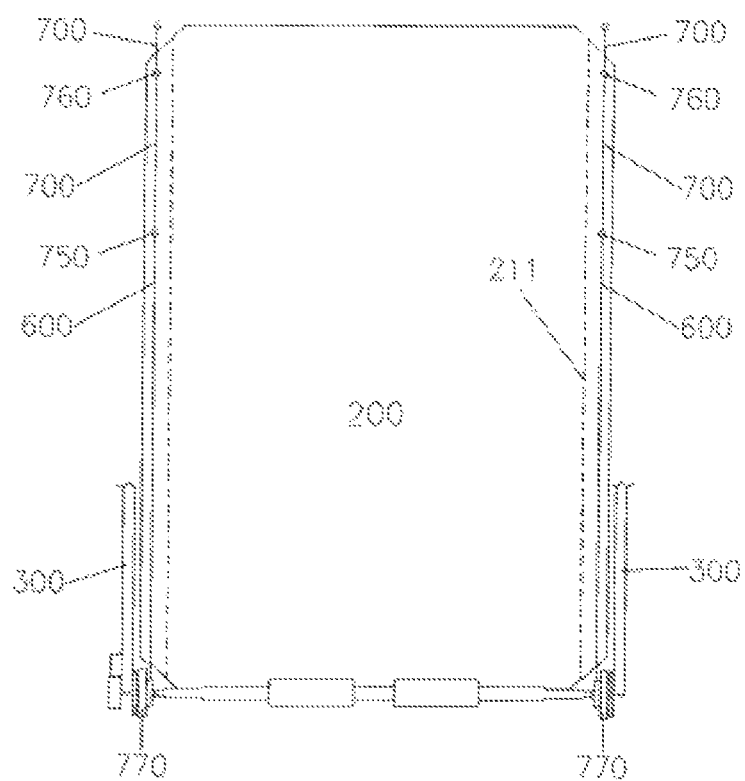

[Fig. 6]
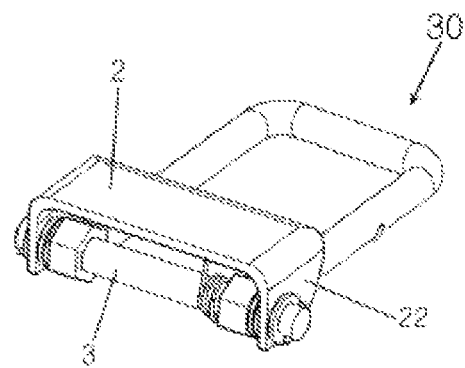

[Fig. 7]
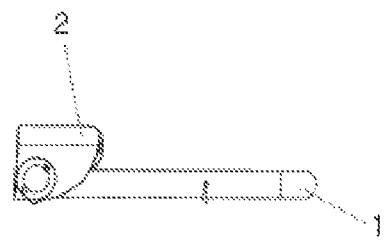
(7A)
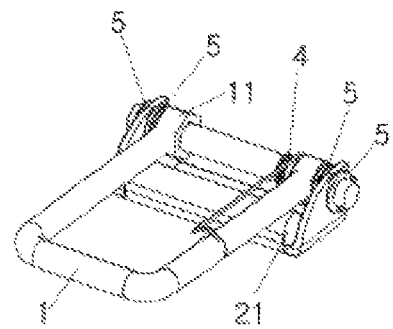
(7B)

【Fig. 8】
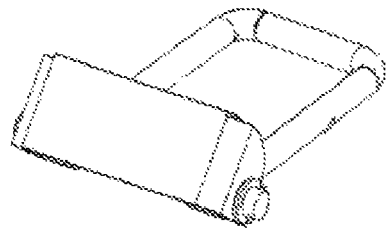
(8A)
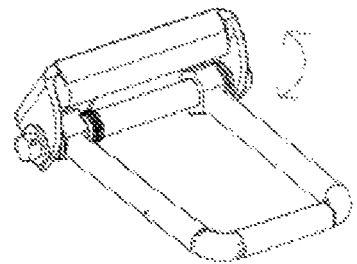
(8B)

AUTOMATIC COVER APPARATUS FOR CARGO COMPARTMENT OF TRUCK

TECHNICAL FIELD

The present invention relates to an automatic cover apparatus of a container of a cargo truck, the apparatus being capable of preventing loss or falling of loaded objects by covering the container of the cargo truck and, more particularly, to an automatic cover apparatus of a container of a cargo truck, the apparatus being capable of easily and automatically controlling a cover of the container of the cargo truck to firmly cover an upper part of the container using a winding drum, tension springs, and stoppers.

BACKGROUND ART

When objects, e.g., food or home appliances, vulnerable to foreign substances such as dust or rain are loaded in a cargo truck, for example, a vinyl cover should be spread thereon and then fixed with a rope to protect the loaded objects from foreign substances. For example, when a garbage truck carries garbage, a cover is provided on a container thereof and a person manually opens or closes the cover or piston rods of cylinders are connected to the cover to forcibly open or close the cover, thereby preventing the garbage from escaping from the container.

For example, rocks fallen from a dump truck may not only obstruct traffic but also damage nearby vehicles. The above problem occurs because a cover is not firmly fixed or no cover is used.

Korean Patent Publication No. 1020110099565 (Sep. 8, 2011) discloses an automatic cover apparatus of a container of a cargo truck, the apparatus including a cover, fixture wires fixed along two edges of the cover and having rear ends protruding from a rear part of the cover, a pair of rotation arms hinge-coupled to bottom center parts of two sides of the container to reciprocate in forward and backward directions of the container, a drum rotatably coupled to upper sides of the rotation arms and connected to the protruding rear ends of the fixture wires to wind or unwind the cover when the rotation arms reciprocate, tension springs provided at the two sides of the container to elastically support the rotation arms toward a rear part of the container, and a driver provided between the rotation arms and the drum to rotate the drum.

Korean Utility Model Registration No. 2001976490000 (Jul. 14, 2000) discloses a cover apparatus of a container of a cargo truck, the apparatus including support rods 1 reciprocating forward and backward with respect to support rod holders 5 connected to ends of the support rods 1 at bottom center parts of sides of the container, and provided at the connected ends of the support rods 1, upper motors 6 and 6' provided at ends of a shaft interconnecting the support rods 1 and fixed to ends of the support rods 1, a shaft connected to the upper motors 6 and 6', a drum 8 connected to the shaft, a cover wound around the drum 8, a side motor 11 provided under the support rod 1 connected to an end of the bottom center parts, a gear 12' provided on the side motor 11, a reducer gear 12 provided at an end of a support rod shaft 16, a chain 13 interconnecting the gears 12 and 12', bearings 15 and 15' provided on the support rod shaft 16, and a spring 4 provided between the bearings 15 and 15', wherein one end of the spring 4 is connected to the cargo truck and another end of the spring 4 is connected to an auxiliary support rod 14.

Korean Patent Registration No. 1004390180000 (Jun. 24, 2004) discloses an automatic cover apparatus of a container of a cargo truck, and a method of opening or closing the same, the apparatus including support rod rotating devices 5 connected to ends of support rods 1 provided at two sides of a base panel where the container is mounted, and driven using springs provided under the connected support rods 1, the support rods 1 reciprocating forward and backward with respect to the support rod rotating devices 5 using the springs, auxiliary support rods 1' coupled to ends of the support rods 1 using hinges 11, air cylinders 12 provided at upper parts of the support rods 1 to fold and unfold the auxiliary support rods 1', a cover holder 2 provided at ends of the auxiliary support rods 1', a cover winder 3 and a cover support rod 4 provided between the driver's seat and the container, and a cover 6 connected to the cover holder 2 and the cover winder 3.

Korean Patent Registration No. 1008494710000 (2008 Jul. 24) discloses an automatic cover apparatus of a container of a cargo truck, in which ends of support rods are coupled to bottom center parts of two sides of the container, a motor is provided at a lower part of the support rods to rotate the support rods, a drum for winding a cover is connected to a shaft interconnecting upper parts of the support rods, and motors are provided at ends of the support rods to rotate the drum such that the drum winds up the cover to open the container, the motors being driven in reverse such that the drum spreads the cover to close the container. Ends of wires are connected to wire holders provided at two ends of the drum and other ends of the wires pass through cover edge sewing parts, and rubber bands are connected to sides of the cover to firmly fix the sides of the container cover, thereby preventing falling of loaded objects from sides of the container.

Korean Patent Publication No. 1020000053861 (2000 Sep. 5) discloses an automatic cover apparatus of a container of a dump truck, the apparatus being capable of preventing escaping of loaded objects and scattering of dust from the container of the dump truck. In consideration of problems of conventional automatic cover apparatuses, e.g., breakdown and reverse operation of an automatic cover apparatus due to limited motor capacity and reduction in speed, and loosening of a cover due to a large number of uses and weakening of spring tension, a motor and a reducer are not used and the cover apparatus is driven using the distance between the container and a body of the dump truck when the container is lifted. As such, breakdown of conventional products due to a motor and a reducer is fundamentally prevented and a problem caused when a spring reaches a fatigue limit is solved.

DISCLOSURE

Technical Problem

In the above-described conventional technologies, according to a structure for forcibly opening or closing a cover by connecting piston rods of cylinders to the cover, since excessive force is applied to the cylinder rods due to the weight of the cover, the cover does not appropriately operate and breakdown frequently occurs.

When a cover is provided at side surfaces of a container of a cargo truck, since a turning radius is large, accidents can occur and the cover may be influenced by peripheral features such as electric wires. In addition, since the cover rotates in a large radius, a weight applied to a rotation shaft is large, quite a large load is applied to a motor, and thus a motor having an unnecessarily large capacity is required, thereby being uneconomical.

A method of covering and then fixing a cover on a container is onerous and thus requires considerable labor and time. In many cases, the cover is open when a cargo truck moves, and thus foreign substances enter from outside or loaded objects escape. Even when a cover is put on a container, since a person should manually open and close the cover, operation is onerous, much labor is required, and safety problems occur. Therefore, the present invention has been made to solve the above problems.

Technical Solution

This application claims the benefits of Korean Patent Registration Nos. 10-0439018 and 10-0849471 of the present applicant, entitled "AUTOMATIC COVER APPARATUS OF CONTAINER OF CARGO TRUCK", the disclosures of which are incorporated herein in their entirety by reference. In accordance with one aspect of the present invention, provided is an automatic cover apparatus of a container of a cargo truck, the apparatus including a cover 200 for opening and closing an upper part of the container, two support rods 300 provided at two sides of the cover 200 to move the cover 200 to front and rear parts of the container, a winding drum 210 provided between the two support rods 300 to wind and withdraw the cover 200, and including two winding drum reinforcers 215 spaced apart from each other and provided at center parts of the winding drum 210, and stoppers 30 spaced apart from each other and tilted downward by 35° to 80° at two upper sides of the rear part of the container.

Advantageous Effects

As apparent from the fore-going, the present invention advantageously provides an automatic cover apparatus of a container of a cargo truck, the apparatus including support rods provided at bottom center parts of two sides of the container and moved forward or backward to wind or spread a cover, which is connected to ends of the support rods, to a front or rear part of the container. Since no vertical turning radius is necessary in operation, accidents due to operation of the cover may be reduced, and air resistance, noise, and blind spots may also be reduced, thereby providing a safe working environment. In addition, since tension springs are connected to lower sides of the support rods, the width of the cover is reduced in a cover winding operation by improving the structure of a winding drum, and the cover is firmly fixed using stoppers, accidents due to operation of the cover may be reduced, and air resistance, noise, and blind spots may also be reduced, thereby reducing time and labor for safe operation and better preventing falling of loaded objects.

DESCRIPTION OF DRAWINGS

FIGS. 1 and 2 are side views of an automatic cover apparatus of a container of a cargo truck, according to the present invention.

FIG. 2 is a detailed view of the automatic cover apparatus according to the present invention.

FIGS. 3A and 3B are detailed views of support rods and tension springs of the automatic cover apparatus according to the present invention.

FIGS. 4A and 4B are detailed views of a winding drum of the automatic cover apparatus according to the present invention.

FIG. 5 is a top view of the automatic cover apparatus according to the present invention.

FIGS. 6, 7A and 7B, and 8A and 8B are detailed views of a stopper of the automatic cover apparatus according to the present invention.

(FIG. 7A: detailed side view, FIG. 7B: detailed bottom perspective view, and FIGS. 8A and 8B: operational perspective views)

BEST MODE

The present invention provides an automatic cover apparatus of a container of a cargo truck, the apparatus including a cover 200 for opening and closing an upper part of the container, two support rods 300 provided at two sides of the cover 200 to move the cover 200 to front and rear parts of the container, a winding drum 210 provided between the two support rods 300 to wind and withdraw the cover 200, and including two winding drum reinforcers 215 spaced apart from each other and provided at center parts of the winding drum 210, and stoppers 30 spaced apart from each other and tilted downward by 35° to 80° at two upper sides of the rear part of the container. The support rods 300 according to the present invention are attached to two sides of a base panel where the container of the cargo truck is mounted, i.e., two sides of the container, and move to the front and rear parts of the container due to tension springs 500 provided at lower sides of the support rods 300. In this case, the support rods 300 are configured to move based on operation of the winding drum 210 and stretching and compression of the tension springs 500. For example, the cover 200 is wound when the tension springs 500 are stretched (extended), and covers the container when the stretched tension springs 500 are compressed (contracted).

Mode of the Invention

The present invention provides an automatic cover apparatus of a container of a cargo truck, the apparatus including a cover 200 for opening and closing an upper part of the container, two support rods 300 provided at two sides of the cover 200 to move the cover 200 to front and rear parts of the container, a winding drum 210 provided between the two support rods 300 to wind and withdraw the cover 200, and including two winding drum reinforcers 215 spaced apart from each other and provided at center parts of the winding drum 210, and stoppers 30 spaced apart from each other and tilted downward by 35° to 80° at two upper sides of the rear part of the container.

The support rods 300 according to the present invention are attached to two sides of a base panel where the container of the cargo truck is mounted, i.e., two sides of the container, and move to the front and rear parts of the container due to tension springs 500 provided at lower sides of the support rods 300. In this case, the support rods 300 are configured to move based on operation of the winding drum 210 and stretching and compression of the tension springs 500. For example, the cover 200 is wound when the tension springs 500 are stretched (extended), and covers the container when the stretched tension springs 500 are compressed (contracted).

An end of the cover 200 according to the present invention is fixed to a top front part of the container, and another end thereof is fixed to the winding drum 210.

Support rod couplers 320 provided at bottom center parts of the container reciprocate back and forth.

An end of each tension spring 500 is fixed to an upper side of each support rod coupler 320, and another end thereof is fixed to a side of a body of the cargo truck.

When a winding motor 220 provided at an upper side of the support rods 600 is driven, the winding drum 210 rotates to withdraw the wound cover 200 and the support rods 300 and the winding drum 210 move toward the rear part of the container.

The tension springs 500 provided at the lower sides of the support rods 300 are compressed (contracted) to slowly move the support rods 300 and the winding drum 500 to the rear part of the container together with a reducer 400.

In the above operation, to prevent falling of loaded objects, wires 600 and rubber bands 700 are provided at the two sides of the cover 200. As such, when the cover 200 is withdrawn from the winding drum 210, the wires 600 inserted into cover edge sewing parts 211 at two edges of the cover 200 are also withdrawn and the cover 200 is firmly fixed using elasticity of the rubber bands 700 connected to the wires 600, thereby preventing falling of loaded objects from the sides of the container.

According to the present invention, since the two stoppers 30 are provided at two upper ends of the rear part of the container, where the winding drum 210 is disposed, the winding drum 210 may be prevented from shaking due to high wind speed and the loaded objects may be prevented from falling from the rear part of the container.

When the winding drum 210 rotates and the cover 200 is completely spread over the rear part of the container, the winding drum 210 is hooked by the two stoppers 30 to firmly fix the cover 200 to the rear part of the container.

According to the present invention, since the container generally has a width of 2.5 m and the cover 200 has a width of 3.4 m, the two sides of the container may be sufficiently covered.

To wind the cover 200 by reducing the width thereof and then spread the cover 200 by increasing the width thereof, the winding drum reinforcers 215, which are made of thick foam, are fixed to the two center parts of the winding drum 210. As such, the width of the cover 200 is reduced in a cover winding operation due to the thick center parts of the winding drum 210, and is increased to the original width thereof in a cover spreading operation to cover the two sides of the container. To uncover the container, the spread cover 200 may be wound in reverse order of spreading.

The winding motor 220 is driven by a driver using electricity of the cargo truck.

When the cover 200 is completely wound around the winding drum 210 and thus the winding drum 210 is disposed at the top front part of the container to uncover the container, although the tension springs 500 provided at the lower sides attempt to move the winding drum 210 and the support rods 300 backward by applying strong force, the reducer 400 serves as a brake and operates only by driving a motor. Thus, when the winding motor 220 is driven, the winding motor 220 moves backward due to force of the tension springs 500, and the reducer 400 slowly rotates the winding drum 210 to withdraw the cover 200 and moves backward so that the cover 200 covers the rear part of the container.

Support rods according to the present invention are attached to two sides of a base panel where a container of a cargo truck is mounted, i.e., two sides of the container, and move to front and rear parts of the container due to tension springs provided at lower sides of the support rods. In this case, the support rods are configured to move based on operation of a winding drum and stretching and compression of the tension springs. For example, a cover is wound when the tension springs are stretched (extended), and covers the container when the stretched tension springs are compressed (contracted).

Hereinafter, the present invention will be described in detail with reference to the attached drawings.

FIGS. 1 and 2 are side views of an automatic cover apparatus of a container of a cargo truck, according to the present invention, FIG. 2 is a detailed view of the automatic cover apparatus according to the present invention, FIGS. 3A and 3B are detailed views of support rods and tension springs of the automatic cover apparatus according to the present invention, FIGS. 4A and 4B are detailed views of a winding drum of the automatic cover apparatus according to the present invention, FIG. 5 is a top view of the automatic cover apparatus according to the present invention, and FIGS. 6, 7A and 7B, and 8A and 8B are detailed views of a stopper of the automatic cover apparatus according to the present invention (FIG. 7A: detailed side view, FIG. 7B: detailed bottom perspective view, and FIGS. 8A and 8B: operational perspective views). A body 1, a fixing plate 2, a fixing rod 3, a spring 4, washers 5, body connectors 11, a fixing plate reinforcing rod 21, fixing plate side parts 22, stoppers 30, a container 100, a container rear part 110, a cover 200, a winding drum 210, cover edge sewing parts 211, winding drum reinforcers 215, a winding motor 220, support rods 300, center shafts 310, support rod couplers 320, tension spring connectors 330, bearing cases 390, a reducer 400, tension springs 500, tension spring holders 510, wires 600, rubber bands 700, wire holders 750, rubber band guide rollers 760, and wire-winding drum couplers 770 are illustrated.

FIGS. 1 to 6 are detailed views of the automatic cover apparatus according to the present invention.

The automatic cover apparatus includes the cover 200 for opening and closing an upper part of the container 100, the two support rods 300 provided at two sides of the cover 200 to move the cover 200 to front and rear parts of the container 100, the winding drum 210 provided between the two support rods 300 to wind and withdraw the cover 200, and including the two winding drum reinforcers 215 spaced apart from each other and provided at center parts of the winding drum 210, and the stoppers 30 spaced apart from each other and tilted downward by 35° to 80° at two upper sides of the container rear part 110.

As illustrated in FIGS. 1 to 3, each of the support rods 300 includes the support rod coupler 320 provided at a lower side, the center shaft 310 attached to a side of the container 100 to insert the support rod coupler 320 thereinto, the tension spring connector 330 provided at a lower side of the support rod 30, the tension spring 500 connected to the tension spring connector 330, the tension spring holder 510 connected to another end of the tension spring 500 and attached to the container 100, the reducer 400 provided at an upper side of one support rod 300, the winding motor 220 connected to the reducer 400, and the bearing case 390 provided at an upper side of another support rod 300.

As illustrated in FIG. 5, the cover 200 has a front end connected to the front part of the container 100 and a rear end fixed to the winding drum 210, and includes the cover edge sewing parts 211 configured as through-holes at two edges of the cover 200, the rubber bands 700 separately fixed to two sides of the front part of the container 100, the rubber band guide rollers 760 provided at front parts of sides of the container 100 to guide the rubber bands 700, the wire holders 750 provided at other ends of the rubber bands 700, the wires 600 inserted into the cover edge sewing parts 211 and having ends connected to the wire holders 750 and other ends fixed to the wire-winding drum couplers 770, and the wire-winding drum couplers 770 separately provided at two edges of the winding drum 210.

As illustrated in FIGS. 6 to 8, the stopper 30 includes the fixing plate 2, the fixing plate side parts 22 extending downward from two sides of the fixing plate 2 and having fixing plate through-holes at center parts thereof, the fixing plate reinforcing rod 21 horizontally provided under the fixing plate 2, the fixing rod 3 passing through the fixing plate through-holes of the two fixing plate side parts 22 and mounted using locking pins 6 and the washers 5, the body 1 having a "⌐⌐" shape and including the body connectors 11 configured as hexagonal head bolts having through-holes therein to allow the fixing rod 3 to pass there through, and the spring 4 provided on the fixing rod 3 and having an end fixed to a side of the body 1.

A description is now given of operation of the automatic cover apparatus.

An end of the cover 200 for covering loaded objects is fixed to a top front part of the container 100, and another end thereof is fixed to the winding drum 210.

When the wound cover 200 is located above the driver's seat (see FIGS. 1 and 3A), if the winding motor 220 is driven, the winding drum 210 connected to the winding motor 220 rotates, the cover 200 is spread over the container rear part 110, the winding drum 210 is moved to the container rear part 110, and the two support rods 300 provided at two ends of the winding drum 210 are also moved to the container rear part 110.

In this case, the tension springs 500 provided at lower sides of the support rods 300 are compressed (contracted) to slowly move the support rods 300 and the winding drum 210 to the container rear part 110 together with the reducer 400.

As illustrated in FIG. 5, the wires 600 are inserted into the cover edge sewing parts 211 at the two edges of the cover 200 and are wound together with the cover 200. When the cover 200 is initially wound, the wires 600 are not inserted into the cover edge sewing parts 211 of the cover 200 but are exposed. Since the wire-winding drum couplers 770 provided on the winding drum 210 are fixed to rotate in an idle mode for initial rotation of the winding drum 210, when the winding drum 210 rotates and proceeds forward, the compressed wires 600 are loosened and the rubber bands 700 compressed and connected to ends of the wires 600 pull the loosened wires 600 to maintain a certain degree of tension. When the ends of the wires 600 reach the cover edge sewing parts 211 of the cover 200, the cover 200 is wound and, at the same time, the wires 600 are wound around the winding drum 210 by the wire-winding drum couplers 770 connected to the wires 600. Since the wires 600 and the rubber bands 700 are provided at the two sides of the cover 200, the cover 200 may be firmly fixed using the wires 600 and elasticity of the rubber bands 700 and thus falling of loaded objects from the sides of the container 100 may be prevented.

When the winding drum 210 contacts the bodies 1 of the stoppers 30 provided at two upper ends of the container rear part 110, due to the weight of the winding drum 210, the springs flare extended and the bodies 1 tilted downward by 35° to 80° are further tilted downward smoothly (see FIG. 8)

The winding drum 210 moves along lower parts of the bodies 1 to inner sides of the bodies 1 and thus the cover 200 spread over the upper part of the container 100 is tightened. When the winding drum 210 is hooked (or obstructed) by the stoppers 30 and thus is no longer capable of proceeding, the winding motor 220 is stopped and the upper part of the container 100 is covered by the cover 200 (see FIG. 2).

Thereafter, the cargo truck moves to a desired place.

To unload the objects loaded in the container 100, if the winding motor 220 is driven in reverse, the winding drum 210 rotates in reverse, moves upward along (the bodies 1 of) the stoppers 30, and is unhooked from the bodies 1 of the stoppers 30. In this case, the extended springs 4 are contracted.

When pressure applied to the bodies 1 is released, the bodies 1 and the fixing rods 3 connected to the bodies return to original positions thereof, and the fixing plate reinforcing rods 21 of the fixing plates 2 interrupt rotation of the bodies 1 to hold the stoppers 30 at original positions thereof.

At the same time, the support rods 300 return to original positions thereof due to contraction of the extended tension springs 500 connected to the support rods 300, and the cover 200 is wound due to reverse rotation of the winding drum 210 provided above the support rods 300, thereby opening the upper part of the container 100.

In this case, to wind the cover 200 by reducing the width thereof and then spread the cover 200 by increasing the width thereof, the winding drum reinforcers 215, which are made of thick foam, are fixed to the two center parts of the winding drum 210. As such, the width of the cover 200 is reduced in a cover winding operation due to the thick center parts of the winding drum 210, and is increased to the original width thereof in a cover spreading operation to cover the two sides of the container 100.

After the winding drum 210 around which the cover 200 is wound is moved to the top front part of the container 100 above the driver's seat, the objects loaded in the container 100 are unloaded.

The winding motor 220 is driven by a driver using electricity of the cargo truck.

INDUSTRIAL APPLICABILITY

The present invention relates to an automatic cover apparatus of a container of a cargo truck, the apparatus including support rods provided at bottom center parts of two sides of the container and moved forward or backward to wind or spread a cover, which is connected to ends of the support rods, to a front or rear part of the container. Since no vertical turning radius is necessary in operation, accidents due to operation of the cover may be reduced, and air resistance, noise, and blind spots may also be reduced, thereby providing a safe working environment.

The invention claimed is:

1. An apparatus comprising:
a cover for opening and closing an upper part of a container;
two support rods provided at two sides of the cover to move the cover to a front and a rear of the container;
a winding drum provided between the two support rods to wind and withdraw the cover, and comprising two winding drum reinforcers spaced apart from each other and provided at center parts of the winding drum; and
stoppers spaced apart from each other and tilted downward by 35° to 80° at two sides of the rear of the container,
wherein the cover has a front end connected to the front of the container, and a rear end fixed to the winding drum, and comprises:
cover edge sewing parts configured as through-holes at two edges of the cover;

rubber bands separately fixed to the two sides of the front of the container;
rubber band guide rollers provided at the two sides of the front of of the container to guide the rubber bands;
wire holders provided at an end of the rubber bands;
wires inserted into the cover edge sewing parts and having ends connected to the wire holders and other ends fixed to wire-winding drum couplers; and
wire-winding drum couplers separately provided at two edges of the winding drum.

2. The apparatus according to claim 1, wherein each of the support rods comprises:
a support rod coupler provided at a lower side;
a center shaft attached to the container to insert the support rod coupler thereinto;
a tension spring connector provided at a lower side of the support rod;
a tension spring connected to the tension spring connector;
a tension spring holder connected to another end of the tension spring and attached to the container;
a reducer provided at an upper side of one of the support rods;
a winding motor connected to the reducer; and
a bearing case provided at an upper side of another of the support rods.

3. The automatic cover apparatus according to claim 1, wherein each of the stoppers comprises:
a fixing plate;
fixing plate side parts extending downward from two sides of the fixing plate and having fixing plate through-holes at center parts thereof;
a fixing plate reinforcing rod horizontally provided under the fixing plate;
a fixing rod passing through the fixing plate through-holes of the two fixing plate side parts and mounted using locking pins and washers;
a body having a "⊔" shape and comprising body connectors configured as hexagonal head bolts having through-holes therein to allow the fixing rod to pass therethrough; and
a spring provided on the fixing rod and having an end fixed to a side of the body.

* * * * *